United States Patent [19]

Angelo et al.

[11] Patent Number: 5,711,533
[45] Date of Patent: Jan. 27, 1998

[54] OILFIELD STUFFING BOX WITH POLISHED ROD ALIGNMENT

[75] Inventors: Lawrence F. Angelo, Conroe; H. Milton Hoff, Tomball, both of Tex.

[73] Assignee: J.M. Huber Corporation, Tomball, Tex.

[21] Appl. No.: 579,328

[22] Filed: Dec. 27, 1995

[51] Int. Cl.$^6$ ........................................ F16J 15/00
[52] U.S. Cl. .......................... 277/105; 277/110; 166/84.1
[58] Field of Search ................................ 277/105, 110, 277/123, 124; 166/84.1, 89.3

[56] References Cited

U.S. PATENT DOCUMENTS

| | | | |
|---|---|---|---|
| 2,069,443 | 2/1937 | Hill | 166/84.1 |
| 2,548,127 | 4/1951 | Slavens | 166/84.1 |
| 2,789,846 | 4/1957 | Moseley | 277/105 |
| 3,384,382 | 5/1968 | Rink | 277/105 |
| 3,488,374 | 1/1970 | Kober et al. | |
| 4,407,510 | 10/1983 | Cornelius | 277/105 |
| 4,480,842 | 11/1984 | Mahyera et al. | |
| 4,560,176 | 12/1985 | Hoff . | |
| 4,613,140 | 9/1986 | Knox . | |
| 5,112,140 | 5/1992 | Cherney et al. | |

OTHER PUBLICATIONS

Huber-Hercules General Product Catalog, HHG-94, May 1994, (Cvr Page, Table of Contents, pp. 5, 121, 17–20 & Back Cvr).

Max. Designs Catalog, 4 pp. (no date available).

Primary Examiner—Daniel G. DePumpo
Attorney, Agent, or Firm—Browning Bushman

[57] ABSTRACT

An oilfield stuffing box 10 employs mating flange plates 15, 16 with bolt holes appreciably larger in diameter than the bolts employed to hold the flange plates together, thereby permitting lateral displacement between the two flange plates. The lateral adjustment permits the tubular stuffing box section 13 carried centrally on the upper plate 15 to be centrally positioned about a polished rod 12 extending between the two flanges. The lower plate 15 is preferably integral with a well head section 14, and is also provided with the large diameter bolt holes to double the range of permitted lateral adjustment. The relative size of the bolts, bolt holes, polished rod diameter and well head diameter are selected for optimum lateral adjustment with a minimum practical hole-to-bolt size differential. A static seal 22 between the two mating flange plates provides a leak-proof seal at any of the different lateral positions between the two flanged sections 13, 14.

16 Claims, 2 Drawing Sheets

FIG. 3
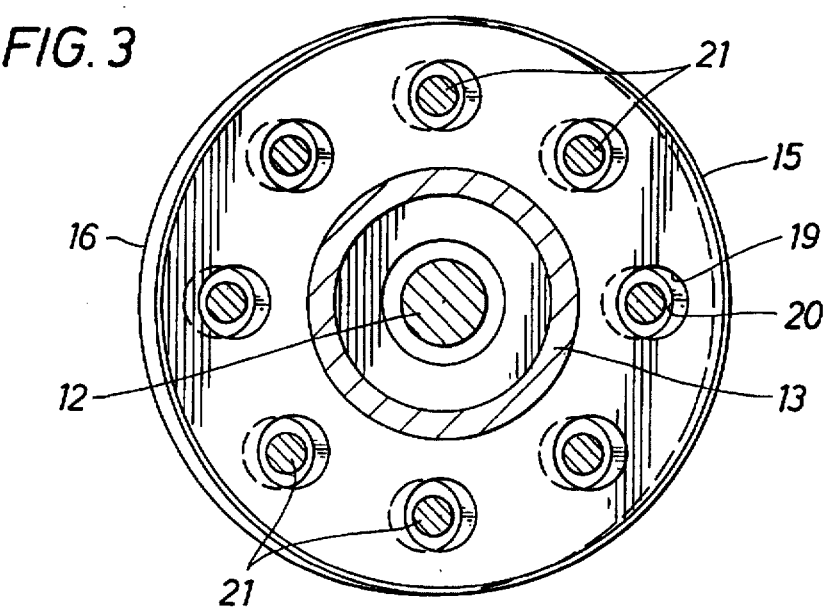
- - - - - $T=3"$, $P=1"$, $H=B+T-P$
— · — $T=3"$, $P=1"$, $H=B+\frac{T-P}{2}$
········ $T=2"$, $P=1.25"$, $H=B+T-P$
——— $T=2"$, $P=1.25"$, $H=B+\frac{T-P}{2}$
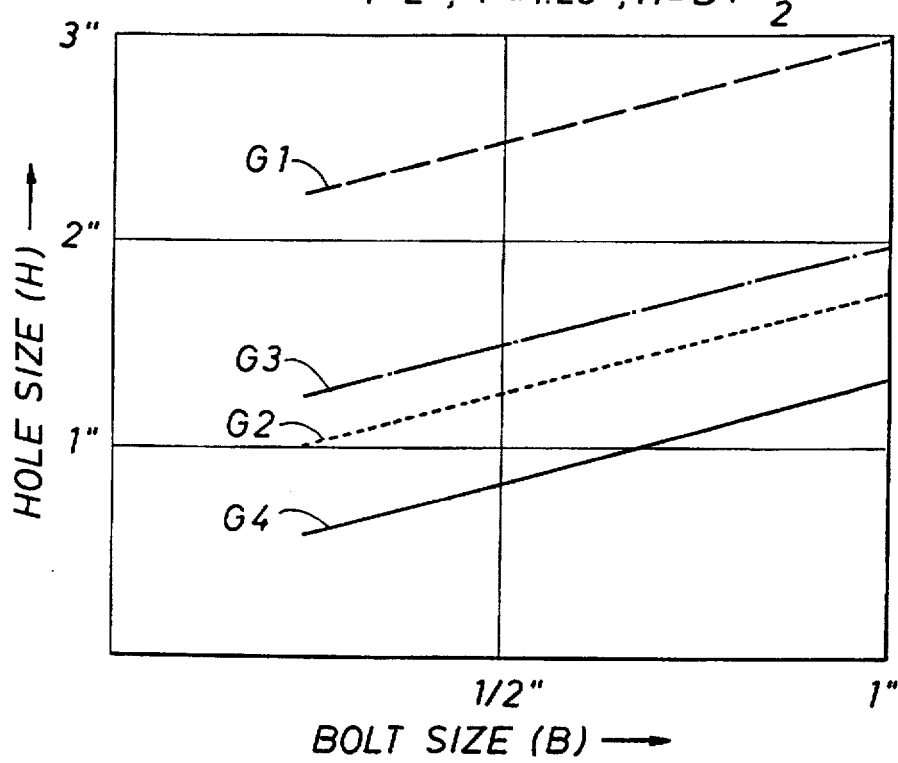
FIG. 4

OILFIELD STUFFING BOX WITH POLISHED ROD ALIGNMENT

FIELD OF THE INVENTION

The present invention relates to an oilfield stuffing box used for sealing engagement with a polished rod which drives a downhole pump. More particularly, this invention relates to an oilfield stuffing box which may be easily and inexpensively aligned with the polished rod to extend the life of both the stuffing box packing and the polished rod.

Brief Description of the Prior Art

Crude oil is typically pumped from underground reservoirs with mechanical pumping units which drive or power reciprocating strings of sucker rods to actuate subsurface pumps. The sucker rod string is equipped with a polished rod section which moves through a dynamic sealing assembly, referred to as a "stuffing box", which is located at the well head. The stuffing box seals with the reciprocating polished rod to prevent the well bore fluids from being vented to the atmosphere. The stuffing box is usually lubricated to ease the movement of the polished rod through the stuffing box and to help prevent wear on the seals used to provide the sliding packoff with the polished rod.

Conventional stuffing boxes function properly when they are centrally aligned with the axis of the polished rod. It is not uncommon for the alignment between the polished rod and the stuffing box to change over a period of time as a result of mechanical shifting between the surface pumping equipment and the well structure. Misalignment produces side loads on both the polished rod and the stuffing box which causes rapid wear of the packing material and, to a lesser extent, wear of the metal polished rod. In some installations, the alignment may be corrected by moving the surface pumping equipment to bring the stuffing box and polished rod back into coaxial alignment. Some of these surface pumping installations weigh many thousands of pounds and are securely anchored to a pumping unit pad at the well site. Repositioning of these structures can require the use of heavy equipment and the efforts of an entire crew working many hours.

The prior art includes several stuffing box designs which permit adjustment of the stuffing box for correcting misalignment without the need for repositioning the pumping mechanism. Examples of these prior art designs may be seen in U.S. Pat. Nos. 5,112,140, 4,613,140, 4,480,842 and 3,488,374, which describe self-adjusting mechanisms to correct for the misalignment between the stuffing box and the polished rod. While the patented designs generally accomplish their intended purpose, they are expensive to manufacture and maintain. Each of the cited patented devices includes a relatively large number of components which contribute to the expense of construction, installation, and maintenance, and also provide increased opportunity for component failure.

A limiting feature of typical adjustable stuffing box alignment designs is the requirement for a dynamic seal to permit relative movement between the stuffing box packing chamber and its mounting mechanism. This dynamic seal, in addition to adding to the expense of construction of the adjustable stuffing box, also provides a wear member which requires maintenance and is frequently the source of leakage.

One prior art adjustable stuffing box design employs a spool assembly mounted within an enclosed oversized housing. The spool assembly, which is free to move laterally within the housing, employs dynamic seals at its top and bottom to seal with the housing. The primary dynamic seal is provided through the center of the spool to form the sliding sealing engagement with the polished rod. This Max Seal Box design, while being less complex in some respects than the patented devices referred to previously, requires three dynamic seals and a number of engaged, interworking components.

The disadvantages of the prior art are overcome by the present invention, which provides a relatively simple and highly reliable stuffing box capable of being periodically aligned with a polished rod, thereby reducing wear on both the seals and the polished rod.

SUMMARY OF THE INVENTION

The adjustable stuffing box of the present invention employs a stuffing box flange mounting for interconnection with a mating well head flange mounting. The well head flange mounting in turn may be threaded to the upper end of a blow out preventer (BOP), to the upper end of a flow tee, or to another well head component. A reliable static seal is employed between the planar engaging faces of the two mating flange mountings. Both flanges are equipped with bolt holes which are sized to permit lateral displacement between the two flanges as required to align the central axis of the polished rod with the central axis of the stuffing box. The bolt hole diameters are determined as a function of the bolt diameter, the tubing internal diameter and the polished rod diameter. The design of the present invention employs a bolt hole diameter which maximizes the range of adjustment for a given range of tubing and polished rod diameter combinations. Accordingly, a minimum number of flanged well head and stuffing box assemblies are employed to cover the largest range of adjustments for expected tubing and polished rod combinations.

The adjustment feature of the present invention is accomplished using only two components held together by conventional flange bolts. The cost of the adjustable stuffing box assembly of the present invention is substantially less than that of the more complicated prior art designs and, because of its simplicity, the assembly is significantly less difficult to operate and maintain.

When misaligament of the polished rod and stuffing box is noted, the system can be realigned by simply loosening (without removing) the bolts securing the two flanges to each other and moving the stuffing box flange relative to the well head flange until the desired alignment is reestablished. Utilization of the appropriate bolt hole dimensions relative to the polished rod diameter and tubing internal diameter ensures that the desired adjustment may occur to center the polished rod within the internal wall of the tubing. The result is a minimum hole size and flange dimension for a given range of tubing, polished rod and stuffing box sizes.

From the foregoing, it will be appreciated that an important object of the present invention is to provide an adjustable stuffing box assembly which employs a minimum number of component parts and is simple to fabricate and employ.

It is also an object of this invention to provide an adjustable stuffing box assembly which may be employed with a range of polished rod and tubing sizes to minimize the number of required inventory components.

The present invention provides an adjustable stuffing box assembly which employs oversized bolt holes formed in flanged fittings where the bolt-holes size is no greater than necessary to provide the maximum lateral adjustment needed for the stuffing box, yet sufficiently great so that practical lateral adjustment may be achieved.

An important feature of the present invention is to provide an adjustable stuffing box assembly which has no dynamic seals except the seals or packing glands which are designed to engage the polished rod.

Another feature of this invention is that the adjustable stuffing box may be easily and inexpensively aligned with the polished rod using conventional tools. By providing a simple yet highly reliable technique to align the polished rod with the stuffing box, the useful life of the stuffing box is extended. As a secondary benefit of the alignment, the life of the polished rod is also extended.

A significant advantage of this invention is the relatively low cost required to manufacture, install and maintain an adjustable stuffing box, thereby enabling the adjustable stuffing box to be used on wells which otherwise would not employ an adjustable stuffing box.

These and further objects, features and advantages of the present invention become apparent from the following detailed description, wherein reference is made to the figures in the accompanying drawings.

BRIEF DESCRIPTION OF THE DRAWINGS

FIG. 3 is an overhead view taken along the line 3—3 of FIG. 2 illustrating details in the hole construction of the assembly of the present invention; and FIG. 4 is a graphical representation of the maximum hole, bolt, well head and polished rod dimensional relationships for a practical range of well applications.

DETAILED DESCRIPTION OF THE PREFERRED EMBODIMENTS

Figure 1:
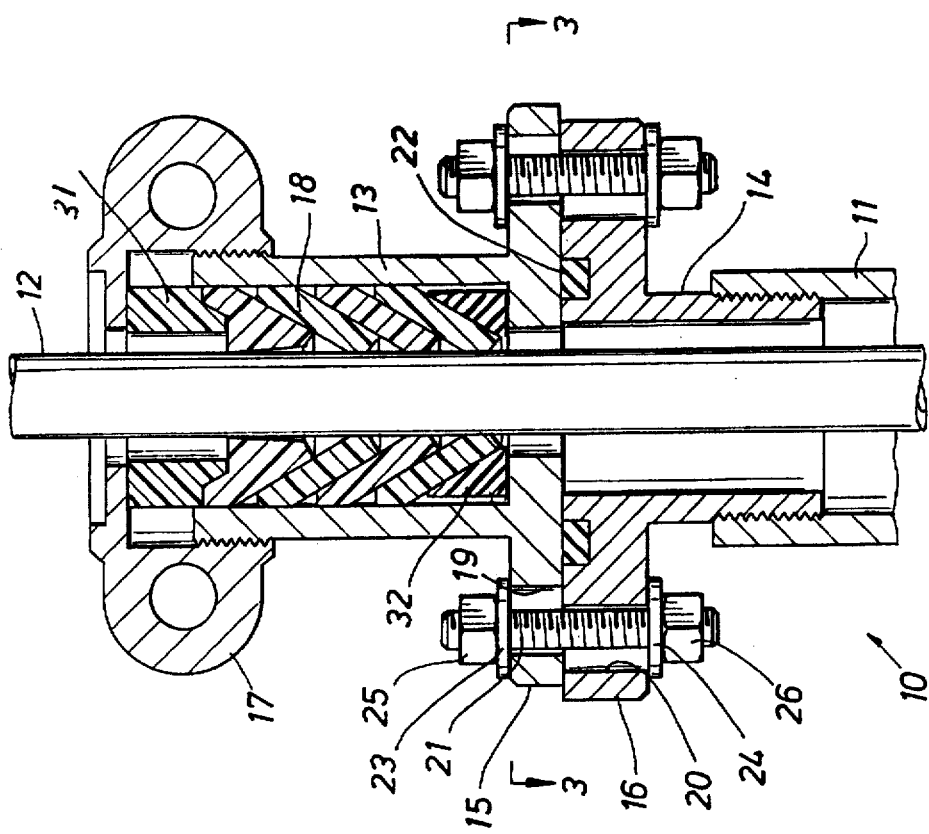
FIG. 1 is a vertical elevation, partially in section, illustrating the adjustable stuffing box assembly of the present invention with a misaligned polished rod.

FIG. 1 of the drawings illustrates an adjustable stuffing box assembly of the present invention indicated generally at 10. The assembly 10 is threaded into a well head component 11. In a typical application, the well head component 11 will be the upper end of a blow out preventer (BOP) or the upper end of a flow tee. A polished rod 12 extends axially downwardly through the assembly 10 and the well head component 11 to a subsurface pump (not illustrated) which is powered by reciprocating movement of the polished rod.

Figure 2:
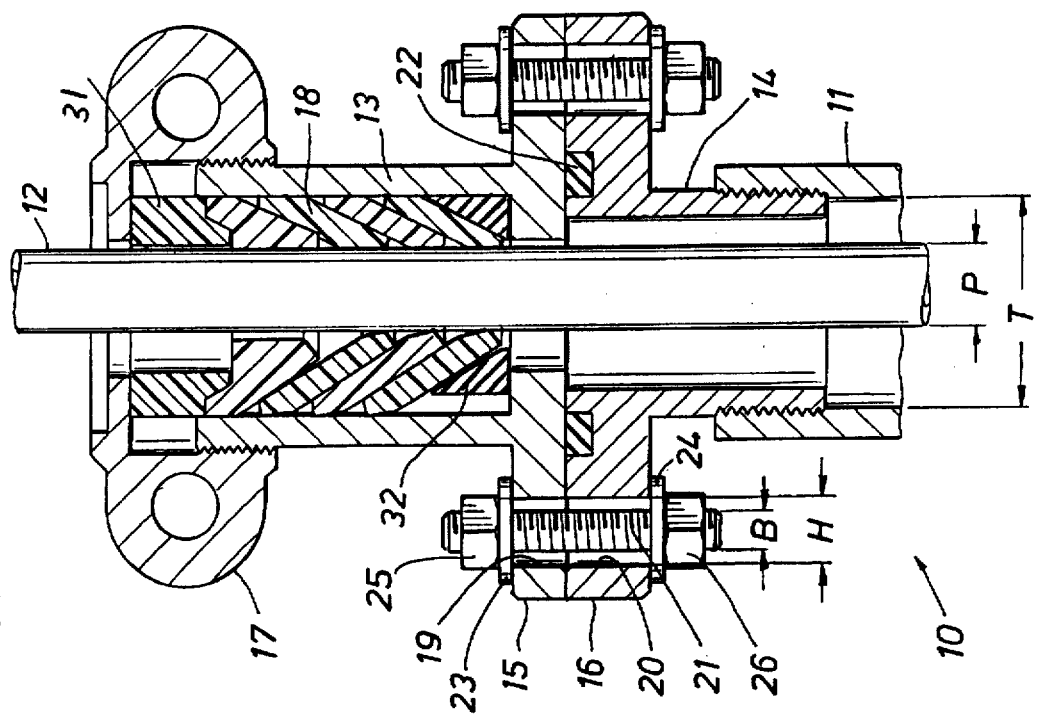
FIG. 2 is a vertical elevation, partially in section, illustrating the adjustable stuffing box of the present invention adjusted to be aligned with the polished rod.

The assembly 10 includes an upper tubular stuffing box section 13 and a lower tubular well head mounting section 14 which mate through circular flanged base plates 15 and 16, respectively. The top of the stuffing box section 13 is threadedly engaged with a cap 17 which serves as a housing for metal top follower 31, which alternatively may be integral with the cap 17. Packing 18 is housed within the stuffing box section of body 13, and provides the sliding and sealing engagement with the polished rod 12. Additional packing, packing glands, or other polished rod sealing members may also be housed within the upper portion of stuffing box section 13. FIGS. 1 and 2 depict an annular alignment ring 32 supported on the lower surface of body 13, and having an interior slope profiled for sliding planar engagement with the lowermost packing gland. Depending on the application, the stuffing box packing glands may be inverted as shown in FIGS. 1 and 2 and as more fully described in U.S. Pat. No. 4,560,176. Alternatively, the stuffing box may utilize more conventional packing gland elements that project radially inward and upward, other than radially inward and downward as shown in FIGS. 1 and 2. A plurality of axially spaced sealing member and packing glands may thus be provided within the cylindrical cavity within the stuffing box section 13. This cavity is formed by a cylindrical wall which has an axis aligned with a central axis of the stuffing box, and is in forced engagement with the outer surfaces of the packing glands.

The well head mounting section 14 is threaded at its lower end and is adapted to be threadedly secured to the upper end of a BOP, as explained above, which in turn communicates with the production fluid being pumped from the well. In other applications, the well head mounting section 14 may be threaded directly to the upper end of a flow tee, or to another wellhead component. The well head mounting section 14 preferably has plate 16 integral with the lower threads which connect to the well head component.

The flange 15 is equipped with oversized bolt holes 19 which cooperate with oversized bolt holes 20 formed in the flange 16 to receive bolts 21 which secure the two flanges together. In a typical design, at least six and preferably eight such bolts are uniformly positioned about the circumference of each flange to secure the flanges to each other. A static annular seal 22 carried by the flange 16 engages and seals against the planar face of the flange 15 to provide a leak proof seal between the mating flange faces. The static seal 22 is provided radially inward of the flange bolts and bolt holes, as shown. The planar engaging face of the flanges 15 and 16 are preferably each perpendicular to the central axis of both the stuffing box 10 and the polished rod 12.

Each bolt 21 is provided with oversized washers 23 and 24 and nuts 25 and 26. The nuts are screwed onto the bolts to draw the two flanges 15 and 16 tightly together to hold the upper and lower components 13 and 14, respectively, of the stuffing box assembly in firm engagement with each other while the polished rod is manipulated to operate the subsurface pump. An oversized bolt head may be provided on each bolt, thereby eliminating one of the washers and nuts for each bolt assembly.

The assembly 10 is illustrated in a misaligned configuration in FIG. 1 with the axis of the polished rod 12 being laterally displaced from the axis of the upper stuffing box section 13. The misalignment causes uneven side loading on the polished rod 12 and the packing 18. This misalignment is corrected in the adjustable stuffing box assembly of the present invention by loosening the nuts 25 or 26 and displacing the top flange 15 laterally relative to the lower flange 16 into the position illustrated in FIGS. 2 and 3. The lateral displacement may be easily accomplished by tapping the loosened plate 15 with a hammer. In the adjusted position, the polished rod remains misaligned with the lower well head mounting section 14 but is coaxially aligned with the stuffing box section 13. The realignment eliminates the undesirable side loading against the packing 18 and the polished rod 12. Once the assembly 10 has been realigned with the polished rod, the bolts 25 and 26 may be retightened to hold the assembly in its adjusted position.

The described adjustment may be easily accomplished without the need for moving the surface pumping equipment or disconnecting the assembly 10 from the well head. Conventional tools comprising a wrench and hammer may be used to achieve adjustment, and the operation may be performed by relatively inexperienced personnel. Since the adjustment mechanism does not rely on a dynamic seal, the useful life of the stuffing box is not reduced by the inclusion of the adjustment mechanism, and maintenance costs for the adjustable stuffing box are substantially the same as for a conventional non-adjustable stuffing box.

It should also be appreciated that the range of lateral adjustment of the stuffing box section of the assembly 10 relative to the central axis of the polished rod may be increased by increasing the diameter of the bolt holes 19 and 20. However, as the size of the bolt holes increases, the size of the flange must also be increased to accommodate the larger bolt holes. Increased hole size also necessitates larger washers 23 and 24 or bolt heads to span the bolt hole opening. Increasing the bolt hole diameter also changes the size differential between the bolt and hole diameters which, if too disparate, may adversely affect the stability of the assembly.

An important feature of the present invention is the provision of an assembly in which the diameters of both the bolt holes 19 and 20 and the bolts 21 are sized for allowing effective adjustment of the stuffing box seals with the polished rod, yet are no larger than necessary to provide full lateral adjustment of the stuffing box section for a selected range of polished rod diameters and well head diameters. FIG. 4 of the drawings illustrates, graphically, the relationship between bolt diameter B and hole diameter H for a selected set of tubing or well head internal diameters T and polished rod external diameters P. The various diameters illustrated in the graphical chart of FIG. 4 are identified in FIG. 1 and are as follows:

H=diameter of bolt hole;

B=diameter of bolt (which is either the diameter of the bolt shank or the outer diameter of the bolt threads, whichever first engages the interior surface of the bolt hole);

T=inside diameter of tubing (or well head component); and

P=diameter of polished rod.

With reference to the dimensions identified in FIG. 1, it will be seen that the maximum lateral offset of the polished rod 12 relative to the central axis of the tubing 11 is:

$$\text{Maximum offset of polished rod} = \frac{T-P}{2}$$

It will be understood that the limiting offset occurs when the polished rod 12 engages the inside wall of the tubing or well head component 11. In the illustration of FIG. 1, the internal restrictions of the stuffing box section 13 are smaller than the internal diameter of the tubing 11. For design considerations, however, the larger tubing dimension is used as a maximum offset condition. Adjustment which can realign for a maximum lateral offset within the larger component in the well head mounting is therefore the limiting design consideration.

The maximum lateral offset of the bolt 21 within the bolt hole 19 is as follows:

$$\text{Maximum offset of bolt in upper flange hole} = \frac{H-B}{2}$$

This offset is a function of only the top flange 15 moving relative to the bolt 22. A similar degree of lateral adjustment occurs between the lower flange 16 and the bolt 21:

$$\text{Maximum offset of bolt in lower flange hole} = \frac{H-B}{2}$$

Where both flanges are provided with equal size bolt-holes, the total lateral offset which may be achieved is as follows:

$$\text{Total lateral adjustment} = \frac{H-B}{2} + \frac{H-B}{2} = H-B$$

In the illustrated design of the assembly of the present invention, where both top and bottom flanges have been provided with equal size bolt holes, the maximum lateral offset of the polished rod 12 is designed to be H–B. Accordingly, maximum lateral offset required is:

$$H-B = \frac{T-P}{2}$$

Solving for hole size:

$$H = B + \frac{T-P}{2}$$

The required maximum hole size to provide the maximum necessary lateral adjustment for a particular tubing and polished rod size is therefore established as:

$$H = B + \frac{T-P}{2}$$

Where only a single flange is equipped with oversized bolt holes, the maximum required lateral adjustment is:

$$H = B + T - P$$

FIG. 4 illustrates a family of graphs which represent hole dimensions in accordance with the teachings of the present invention for expected maximum differentials between tubing diameters and polished rod diameters. The dashed line G1 represents the relationship between bolt size and hole size for an assembly in which only a single flange is equipped with oversized holes and the tubing has a 3" internal diameter and the polished rod has a 1" diameter. The dashed line G2 represents a single flange modification with oversized holes in which the tubing internal diameter is 2" and the polished rod diameter is 1.25".

The solid line G3 illustrates a dual flange modification in which the tubing internal diameter is 2" and the polished rod diameter is 1". The line G4 illustrates the dual flange modification with an internal tubing diameter of 2" and a polished rod diameter of 1.25".

Pumping wells commonly use polished rods which vary in size from a minimum of 1.0" to a maximum of about 1.75" (which is for the combination polish rod and liner). Normal tubing outside diameters in these wells typically vary from 2⅜" to 3½" with corresponding typical internal diameters for the tubing varying from 1.995" to 2.992". Standard bolts employed in API flange fittings in the tubing ranges of 2⅜" to 3½" have an outside diameter of either ⅝" or ¾". It is standard practice to provide flanged connections (for flanges designed for use with pressures up to 2000 psi) with bolt hole diameters ⅛" over the bolt diameter. Accordingly, for pipe in the range of 2⅜" to 3½" and polished rods of 1" to 1 ¾", it is standard practice to employ flanges with bolts of from ⅝" to ¾" diameter and bolt holes of from ¾" to ⅞" diameter.

In the standard flange assembly employed to mate tubulars ranging from 2⅜" to 3½", the bolt-to-hole diameter ratio is approximately:

$$\text{Standard hole-to-bolt diameter ratio: } \frac{7/8" \text{ hole}}{3/4" \text{ bolt}} = 1.17$$

or $$\frac{3/4" \text{ hole}}{5/8" \text{ bolt}} = 1.20$$

In accordance with the teaching of the present invention, a significantly greater hole-to-bolt diameter ratio is provided which permits substantially more lateral adjustment between mating components than is possible with the standard bolt and bolt hole arrangements. The maximum hole diameter using the teachings of the present invention is also limited as a function of the expected range of tubing inside diameter and polished rod diameter. From the foregoing, it will be understood that the adjustable stuffing box assembly of the present invention employs the following relationship between bolt-hole and bolt diameters:

Single flange embodiment
$$1.60\, B \leq H \leq B + T - P$$

Dual flange embodiment
$$1.30\, B \leq H \leq B + \frac{T-P}{2}$$

Application of the foregoing hole-to-bolt dimensions ensures that lateral adjustment may be achieved. In more preferred embodiments, the hole-to-bolt diameter ratio for the single flange embodiment is at least 1.80, and for the dual flange embodiment is at least 1.40.

In most applications, the stuffing box is intended for threaded engagement with the well head component. Accordingly, the stuffing box of the present invention will include both a tubular stuffing box section 13 and a well head mounting section 14. The planar engaging surfaces of the plates or flanges 15, 16 are each perpendicular to the central axis of the stuffing box and the central axis at the polished rod. Each plate or flange 15, 16 preferably has holes significantly larger than the diameter of the bolts, as disclosed herein. In other cases, the upper end of the well head component includes a flange. For that installation, the stuffing box need not include a well head mounting section 14, and only the bolt holes in the plate or flange 16 of the stuffing box section 13 need be oversized to allow lateral adjustment.

While bolt and nut assemblies are preferably used to secure the flanges or plates 15 and 16 together, other securing members, each preferably having a generally cylindrical body passing through the holes in the plate, or flanges, may be used according to this invention. If only one flange has oversized bolt holes, the bolt could be threaded to a mating threaded hole in the other flange. Accordingly, the term "bolt" is used herein to broadly describe a securing member having a generally cylindrical body and one or two end members each for engagement with a respective flange. Each of the flange interconnecting bolts of a stuffing box preferably have the same nominal diameter, although in theory, different diameter bolts could be sized for passing through different diameter bolt holes.

The foregoing disclosure and description of the invention is illustrative and explanatory thereof. It will be appreciated by those skilled in the art that various changes in the size, shape and materials as well as in the details of the illustrated construction or combinations of features and the method discussed herein may be made without departing from the spirit of the invention.

What is claimed is:

1. An axially extending stuffing box adapted to receive an axially extending polished rod, said polished rod being axially extending through said stuffing box and through a well head moveable component to power a subsurface pump in a well, the stuffing box comprising:

a sealing material carried within a stuffing box section to seal with said polished rod as said rod moves through said stuffing box;

a first flange mounting connected to said stuffing box section for mounting said stuffing box section on said well head component;

a second flange mounting threadably connected to said well head component and in planar engagement with said first flange mounting by bolted engagement with the first flange mounting;

a plurality of circumferentially spaced first bolt holes in said first flange mounting;

a plurality of circumfemntially spaced second bolt holes in said second flange mounting; and a plurality of bolts each received within a respective one of said first and second bolt holes; and each of said first and second bolt holes having a diameter which is at least 30% greater than the diameter of a respective one of the plurality of bolts, whereby said first and second flange mountings may be positioned and secured by said plurality of bolts at different lateral positions on said well head component to adjust the axis of said stuffing box relative to the axis of said well head component.

2. The stuffing box as defined in claim 1, further comprising:

a static seal positioned between said first and second flange mountings and radially inward of both said first and second bolt holes for providing a leak proof seal therebetween at said different lateral positions of said first flange mounting on said second flange mounting.

3. The stuffing box as defined in claim 1, further comprising:

an outside diameter of said polished rod having a dimension P;

an inside diameter of said well head component having a dimension T;

an inside diameter of each of said plurality of first bolt holes having a dimension H;

an outside diameter of each of said plurality of bolts having a dimension B; and wherein the following relationship is satisfied:

$$1.30 B \leq H \leq B + T - P.$$

4. The stuffing box as defined in claim 1, further comprising:

an integral well head mounting section including lower threads for threaded engagement with the well head component and a second flange mounting adapted for mating engagement with the first flange mounting.

5. An axially extending stuffing box adapted to receive an axially extending rod, said rod being moveable through said stuffing box and through a well head component to power a subsurface pump in a well, the stuffing box comprising:

a packing gland carried within a stuffing box section and adapted to seal with said rod as said rod moves through said stuffing box section;

a first flange mounting connected to said stuffing box section for mounting said stuffing box on said well head component, said first flange mounting having a lower planar surface substantially perpendicular to a central axis of the stuffing box;

a second flange mounting threadably connected to said well head component and in planar mating engagement with said first flange mounting by bolted engagement with the first flange mounting, said second flange mounting having an upper planar surface substantially perpendicular to the central axis of the stuffing box;

a plurality of circumferentially spaced first bolt holes in said first flange mounting;

a plurality of circumferentially spaced second bolt holes in said second flange mounting; and a plurality of bolts each receivable within a respective one of said first bolt holes and second bolt holes, each of said first bolt holes and second bolt holes having a diameter which is at least 30% greater than the diameter of a respective one of the plurality of bolts, whereby said first flange mounting may be positioned and secured by said plurality of bolts at different lateral positions on said second flange mounting to adjust the axis of said stuffing box relative to the axis of said well head component.

6. The stuffing box as defined in claim 5, further comprising:

a static seal positioned between said first and second flange mountings and radially inward of both said first and second bolt holes for providing a leak proof seal therebetween at said different lateral positions of said first flange mounting on said second flange mounting.

7. The stuffing box as defined in claim 5, further comprising:

an outside diameter of said polished rod having a dimension P;

an inside diameter of said well head component having a dimension T;

an inside diameter of each of said plurality of first and second bolt holes having a dimension H;

an outside diameter of each of said plurality of bolts having a dimension B; and wherein the following relationship is satisfied:

$$1.30 B \leq H \leq B + \frac{T-P}{2}.$$

8. The stuffing box as defined in claim 7, wherein the relationship is satisfied:

$$1.40 B \leq H \leq B + \frac{T-P}{2}.$$

9. The stuffing box as defined in claim 5, further comprising:

an integral well head mounting section including lower threads for threaded engagement with the well head component and said second flange mounting adapted for mating engagement with the first flange mounting.

10. An axially extending stuffing box for receiving an axially extending polished rod, said polished rod being moveable within said stuffing box and a well head component to power a subsurface pump in a well, the stuffing box comprising:

a plurality of packing glands each carried within a stuffing box section and adapted to seal with said polished rod as said rod moves through said stuffing box;

a first flange mounting connected to said stuffing box section for mounting said stuffing box on said well head component;

a second flange mounting threadably connected to said well head component and in planar mating engagement with said first flange mounting by bolted engagement with a first flange mounting;

a plurality of circumferentially spaced bolt holes in each of said first flange mounting and said second flange mounting; and a plurality of bolts each receivable within a respective one of said bolt holes, each of said bolt holes in both said first flange mounting and said second flange mounting having a diameter which is at least 30% greater than the diameter of a respective one of the plurality of bolts, whereby said first flange mounting may be positioned and secured by said plurality of bolts at different lateral positions relative to said second flange mounting to adjust the axis of said stuffing box relative to the axis of said well head component.

11. The stuffing box as defined in claim 10, wherein said stuffing box section includes a cylindrical cavity therein for receiving the plurality of packing glands.

12. The stuffing box as defined in claim 10, further comprising:

a static seal positioned between said first and second flange mountings and radially inward of both said first and second bolt holes for providing a leak proof seal therebetween at said different lateral positions of said first flange mounting on said second flange mounting.

13. The stuffing box as defined in claim 10, further comprising:

an outside diameter of said polished rod having a dimension P;

an inside diameter of said well head component having a dimension T;

an inside diameter of each of said plurality of bolt holes in said at least one of said first flange mounting and second flange mounting having a dimension H;

an outside diameter of each of said plurality of bolts having a dimension B; and wherein the following relationship is satisfied:

$$1.30 B \leq H \leq B + \frac{T-P}{2}.$$

14. The stuffing box as defined in claim 13, wherein the inside diameter of each of said plurality of first bolt holes and each of said plurality of second bolt holes has a dimension H, and the relationship is satisfied:

$$1.40 B \leq H \leq B + \frac{T-P}{2}.$$

15. The stuffing box as defined in claim 10, further comprising:

an integral well head mounting section including lower threads for threaded engagement with the well head component and said second flange mounting adapted for mating engagement with the first flange mounting.

16. The stuffing box as defined in claim 10, wherein each of said first flange mounting and second flange mounting includes at least six circumferentially spaced bolt holes.

* * * * *

UNITED STATES PATENT AND TRADEMARK OFFICE
CERTIFICATE OF CORRECTION

PATENT NO. : 5,711,533
DATED : January 27, 1998
INVENTOR(S) : Angelo et al.

It is certified that error appears in the above-indentified patent and that said Letters Patent is hereby corrected as shown below:

In col. 8, line 21, change "circumfemntially" to --circumferentially--.

Signed and Sealed this

Fourteenth Day of April, 1998

Attest:

BRUCE LEHMAN

Attesting Officer

Commissioner of Patents and Trademarks